United States Patent Office 3,239,318
Patented Mar. 8, 1966

3,239,318
RECOVERING STRONTIUM CHLORIDE
FROM BRINE
Robert D. Goodenough, Midland, Mich., assignor to The Dow Chemical Company, Midland, Mich., a corporation of Delaware
No Drawing. Filed July 9, 1962, Ser. No. 208,619
7 Claims. (Cl. 23—298)

This application is a continuation-in-part of application S.N. 25,228, filed April 28, 1960, now abandoned.

The invention relates to a process for the recovery of strontium chloride from a brine containing calcium chloride, strontium chloride, magnesium chloride, and potassium chloride and which may also contain other salts, e.g., sodium chloride and boron compounds.

There are numerous natural deposits of either natural brines or residues left by evaporation of synthetic aqueous solutions which contain such salts as the chlorides of calcium, potassium, sodium, magnesium, and strontium in varying proportions. In some processes, synthetic brines are produced as a source of by-products. In both natural and synthetic brines, sodium chloride and calcium chloride are among the predominant constituents, together with some strontium chloride. As a rule, the brines usually contain a high concentration of sodium chloride, which must be removed first, usually by crystallization effected by evaporation of water at controlled conditions, before attempts are made to obtain other chlorides dissolved therein. Following the evaporation, the potassium chloride and magnesium chloride are crystallized out as carnallite upon cooling from say about 50° to 24.° C. at standard pressure.

When carnallite is thus precipitated from a calcium chloride brine containing a small but significant amount of strontium chloride, the major portion of the strontium chloride cocrystallizes with the carnallite. The carnallite crystals are relatively large, being on the order of 40–60 mesh size, whereas the strontium chloride crystals are relatively small, being on the order of 200–300 mesh size. The strontium chloride crystals, accordingly, are found more-or-less on the faces of the larger carnallite crystals. Some calcium chloride from the mother liquor adheres to the crystals of carnallite and strontium chloride. A satisfactory method of recovering the strontium chloride which has so cocrystallized with the carnallite is highly desired, not only for the value of the chemical, but also because its presence in the carnallite constitutes a contaminant.

To recover strontium chloride from carnallite crystallized from brines is made more difficult by the presence of boron, which is almost always found in an amount of from 100 to 400 parts per million parts of the concentrated brine (i.e. after it has been evaporated). The boron is also carried down with the carnallite. While the boron contamination may not be very large, it is especially objectionable and cannot be tolerated in the carnallite for many uses. Thus it is desirable, not only to separate the strontium chloride therefrom, but also to free the carnallite from any boron contamination.

It is, therefore, an object of the invention to provide a method of recovering strontium chloride from brines containing calcium chloride, magnesium chloride, and potassium chloride as well as strontium chloride. Another object is to provide a method of recovering strontium chloride from carnallite containing strontium chloride and calcium chloride which has been crystallized out of brines containing such salts. A further object is to provide a process for removing boron from carnallite crystallized from calcium chloride brines which also contain boron. The practice of the invention attains these and related objects.

The invention, accordingly, is a method of recovering strontium chloride by (1) evaporating a brine, at above 67° C., containing halide salts dissolved therein including strontium chloride, calcium chloride, potassium chloride, and magnesium chloride, wherein the weight ratio of calcium chloride to strontium chloride is greater than 1 but less than 43.4/0.36 or about 120 and the amount of calcium chloride concentration in the brine is not in excess of about 47.5 weight percent taken at 30° C., until substantially all of any sodium chloride present has crystallized, and a substantial portion of the potassium chloride and magnesium chloride has crystallized as carnallite but at least about 2 percent and preferably about 6 percent of magnesium chloride by weight of the concentrated brine, and at least a molar ratio of 1 and preferably a slight molar excess thereof per mole of potassium chloride, remains in solution in the brine; (2) cooling the thus concentrated brine to a temperature below about 50° C. and preferably to just above 24.8° C., i.e., the freezing temperature, to form a solid phase of the remaining potassium chloride and substantially all the remaining magnesium chloride as crystalline carnallite together with strontium chloride present; (3) separating the solid phase thus formed; (4) admixing with the thus separated crystalline solid phase an amount of water sufficient to provide between about 0.1 and about 0.25 part by weight of water per part of total solids to leach out calcium chloride and strontium chloride from the carnallite solid phase; and (5) separating the strontium chloride so made from the calcium chloride.

The purpose of the initial evaporating step is both to remove NaCl, which is nearly universally present in natural brines, and to concentrate the brine. During such evaporation step, it is required that some magnesium chloride and potassium chloride remain in solution, for the purpose of subsequently aiding in carrying down the $SrCl_2$. The theory or mechanics involved which requires the presence of a minimum amount of magnesium chloride and potassium chloride is not definitely clear. It appears, however (although it is to be understood that the invention is not to be considered as dependent on any theory) that the principle involved is one of nucleation wherein the crystals of carnallite serve as crystallization sites for the relatively smaller crystals of $SrCl_2$.

The presence of $CaCl_2$ has been found to be essential. Similarly to the role played by the carnallite, a theory involving the role played by the $CaCl_2$ is not clear. It has been found, however, by repeating experimental runs using brines containing $MgCl_2$, KCl, and $SrCl_2$ but no $CaCl_2$ in the repeat run (which run in the first instance gave high $SrCl_2$ recoveries in the presence of the requisite $CaCl_2$) such repeating runs give only about 2.5 percent by weight of the $SrCl_2$ that had been recovered in the presence of the $CaCl_2$ according to the invention.

The amount of water added in the step, identified as step (4) above, is highly critical. When an amount of water is employed which is less than about 0.1 part by weight of the total solids of the resulting wash or leach solution, the amount of $SrCl_2$ recovered is undesirably low. When the amount of water employed is in excess of about 0.25 part per part by weight of the total solids present, the solution formed consists of too high a percentage of $MgCl_2$. Best results are obtained when an amount of water is employed in step (4) which gives a solution consisting of between about 14 and 20 percent of the total solids of the resulting solution taken at 30° C.

Procedures for the separation of $SrCl_2$ from the mixture of $SrCl_2$ and $CaCl_2$ are known. A particularly effective procedure is that described in U.S. Patent 3,029,133. Another effective procedure is to cool a concentrated aqueous solution thereof to a temperature below 24.8°

C., say to about 6° C. wherein the strontium chloride present precipitates as $SrCl_2 \cdot 6H_2O$.

Many naturally occurring brines contain, among the halide salts dissolved therein: $SrCl_2$, $CaCl_2$, $MgCl_2$ and KCl. Evaporation of any of these brines to between about 40 and 60 percent of its original volume results in crystallizing out the major portion of the sodium chloride present in the brine and gives a solution having the desired concentration of the above named halides for the recovery of $SrCl_2$ therefrom in accordance with the practice of the invention. Well known natural inland brines, having specific gravities in the range of 1.25 to 1.3 contain, as the main constituents, the following.

| Ingredient: | Weight percent |
|---|---|
| Calcium chloride | 19–22 |
| Magnesium chloride | 2.5–4 |
| Sodium chloride | 4–8 |
| Potassium chloride | 1–3 |
| Strontium chloride | 0.1–1.0 |
| Ammonium chloride | 0.05–0.5 |
| Lithium chloride | 0.01–0.1 |

To carry out the invention, the brine is evaporated at a temperature above about 67° C. usually above about 70° C., until the desired total solids are satisfactorily increased and the major portion of the sodium chloride crystallizes out and is subsequently separated therefrom. In such brine, the desired amount of magnesium chloride is usually present in the brine to give a molar ratio of magnesium chloride to potassium chloride of at least an equimolar ratio and preferentially a molar excess of magnesium chloride. The ratio of $CaCl_2$ to $SrCl_2$ must be greater than equimolar, i.e., greater than about 0.7 by weight, because when no more than one mole of $CaCl_2$ is present per mole of $SrCl_2$, the double salt hexahydrate, viz., $CaCl_2 \cdot SrCl_2 \cdot 6H_2O$ forms. It is preferred that there be a substantial preponderance of $CaCl_2$ over $SrCl_2$, e.g., a weight ratio of $CaCl_2/SrCl_2$ of from 50 to 100. However, if the magnesium chloride concentration is not high enough, more magnesium chloride may be added. Since, in the practice of the invention the carnallite (following removal therefrom of the strontium chloride and adhering calcium chloride) is water leached and the leachate therefrom contains magnesium chloride, such leachate may be conveniently recycled to provide additional magnesium chloride. It is preferred to maintain the molar ratio of magnesium chloride to potassium chloride in the range of from 2 to 3. The amount of magnesium chloride required to be present in the solution, as aforesaid, is such that, after crystallization of the carnallite, the magnesium chloride content in the mother liquor is at least about 2 weight percent thereof.

Upon crystallization of the remaining carnallite, the crystals carry down the strontium chloride crystals and some adhering calcium chloride; the carnallite product usually has from about 4 to about 20 percent by weight thereof, of calcium chloride as adhering mother liquor. Generally under normal crystallization conditions, the amount of calcium chloride carried down is in the range of from about 6 to about 10 percent by weight of the crystalline product. It is believed that the strontium chloride cocrystallizes with the carnallite at the above conditions as $SrCl_2 \cdot 2H_2O$. The carnallite containing the $SrCl_2 \cdot 2H_2O$ and adhering $CaCl_2$ thus crystallized from the concentrated solution is contacted, i.e., leached or washed, with a limited amount of water to dissolve selectively the strontium chloride and also wash off the calcium chloride. By employing a limited amount of water the crystallized strontium chloride and adhering calcium chloride are substantially dissolved or extracted from the carnallite product without dissolving any appreciable proportion of the carnallite. When the specified amount of water is used in accordance with the invention, a solution is obtained containing substantially all of the adhering calcium chloride and over 90 percent of the strontium chloride which was crystallized with the carnallite.

The following examples are illustrative of the invention.

Example 1

An inland brine having a specific gravity of 1.29 was analyzed and found to have the following content of the more predominant constituents.

| | Weight percent |
|---|---|
| $CaCl_2$ | 21.0 |
| $MgCl_2$ | 3.9 |
| NaCl | 5.5 |
| KCl | 1.6 |
| $SrCl_2$ | 0.5 |
| $NH_4Cl$ | 0.1 |
| LiCl | 0.04 |

The above brine was evaporated, thereby crystallizing out a substantial portion of the sodium chloride, and concentrating the brine to a solution which contained 35.5 percent by weight of calcium chloride and correspondingly increased concentrations of other salts. It was then cooled to approximately 28° C. to crystallize out the carnallite product consisting essentially of remaining carnallite together with $SrCl_2 \cdot 2H_2O$, boron compounds and some adhering $CaCl_2$ mother liquor. The carnallite product thus obtained from the concentrated brine had the following analysis.

| Component: | Weight percent |
|---|---|
| $MgCl_2$ | 25.8 |
| KCl | 17.8 |
| $CaCl_2$ | 8.8 |
| $SrCl_2$ | 4.2 |
| NaCl | 2.2 |
| $NH_4Cl$ | 1.4 |
| B, 162 p.p.m. | |

A sample of 1615 grams of the above carnallite product was placed in a vessel, and 323 grams of water at 32° C. admixed therewith followed by occasional mild stirring. This represented 20 weight percent of water based upon the weight of the carnallite product and gave a resulting solution containing 14.3 weight percent of $CaCl_2$. After 15 minutes, the slurry was filtered in a Buchner funnel and the precipitate and filtrate so obtained were analyzed.

The precipitate obtained weighed 1037 grams and had the following analysis.

| Component: | Weight percent |
|---|---|
| $MgCl_2$ | 30.1 |
| KCl | 24.2 |
| $CaCl_2$ | 1.64 |
| $SrCl_2$ | 0.9 |
| NaCl | 1.9 |

The filtrate weighed 874 grams and had the following analysis.

| Component: | Weight percent |
|---|---|
| $CaCl_2$ | 14.1 |
| KCl | 3.5 |
| $SrCl_2$ | 6.9 |
| B, 277 p.p.m. | |

The material balances made on potassium chloride, strontium chloride, and boron in the filtrate showed that it contained 10.6 percent, 87.7 percent, and 92.6 percent, respectively, of those constituents originally present in the carnallite.

The strontium chloride was recovered from 60.2 pounds of the filtrate solution, containing 5.32 weight percent of strontium chloride, by cooling the solution from 25° C. down to 6° C. over a period of 16 hours. A crystalline product, in an amount of 6.3 pounds, was thereby obtained which was separated from the mother liquor by filtration. Upon analysis it was found that the crystalline product contained 81 percent $SrCl_2 \cdot 6H_2O$. The resulting mother liquor contained 2.45 percent $SrCl_2$. This represented approximately 63 percent recovery of the strontium chloride as a solid product from the original filtrate or solution. If desired a higher recovery of strontium chloride could have been obtained by cooling the solution to a lower temperature.

Example 2

To illustrate further the scope of the invention, an evaporated brine, containing calcium chloride as a principal constituent and possessing a specific gravity of 1.481 at 80° C., was slowly cooled and, at different temperatures, samples of the mother liquor were analyzed for $SrCl_2$ and KCl and, in the solid phase, for $SrCl_2$, $MgCl_2$, KCl and $NH_4Cl$. The analytical values obtained are as follows:

MOTHER LIQUOR COMPOSITION

| Temperature in ° C | 80 | 55 | 45 | 35 | 27 |
|---|---|---|---|---|---|
| Slurry in grams | | 1,000 | 902 | 857 | 840 |
| Filtrate in grams | 1,000 | 902 | 857 | 840 | 832 |
| Solids in grams | | | 94 | 45 | 17 | 8 |
| Filtrate, sp. gr | 1.481 | 1.483 | 1.487 | 1.493 | 1.496 |
| Percent $SrCl_2$ by weight | 2.15 | 2.03 | 0.96 | 0.83 | 0.72 |
| Percent KCl by weight | 3.57 | 2.27 | 1.43 | 0.99 | 0.90 |

SOLID PHASE COMPOSITION

| Temperature in ° C | 80* | 55 | 45 | 35 | 27 |
|---|---|---|---|---|---|
| Percent $MgCl_2$ | | 21.27 | 22.8 | 23.1 | 23.1 |
| Percent KCl | | 16.32 | 16.2 | 16.2 | 16.2 |
| Percent $SrCl_2$ | | 1.39 | 6.16 | 6.23 | 6.28 |
| Percent $NH_4Cl$ | | 1.43 | 1.2 | 1.2 | 1.2 |

* Only liquid phase present at 80° C.

These values show that as the temperature was lowered, the $SrCl_2$ present in the recoverable solid phase very markedly increased between 55° and 45° C. and thereafter continued to increase, but very gradually as the temperature was further lowered down to 27° C.

Example 3

Following is an example wherein samples of the same brine employed in Example 2 were cooled from 80° C. to 55° C., the supernatant mother liquor separated from the solid phase, and the thus separated mother liquor cooled in temperature decrements. After each decrease in temperature, the percentage composition of the solid phase crystals was ascertained and are set out below:

SOLID PHASE COMPOSITION IN PERCENT BY WEIGHT

| Temperature in ° C | 45 | 35 | 27 |
|---|---|---|---|
| $MgCl_2$ | 26.39 | 26.2 | 25.9 |
| KCl | 16.02 | 16.2 | 16.0 |
| $SrCl_2$ | 17.26 | 14.55 | 13.8 |
| $NH_4Cl$ | 0.69 | 0.79 | 0.79 |

The mother liquor which was separated from the solid phase at 28±1° C., had the following analysis: 41.69% $CaCl_2$, 6.28% $MgCl_2$, 0.63% $SrCl_2$, 0.70% KCl, and 0.43% NaCl.

The values obtained show that the precipitation temperature of the carnallite product may be anywhere between 45° and 27° C. Actually, any temperature below the temperature at which carnallite is soluble in water, viz., about 67° C., and any temperature above the freezing point of aqueous $CaCl_2$, viz., 24.8° C., at atmospheric pressure, is satisfactory.

Example 4

To show the effect of different ratios of water to the carnallite product in the leaching step of the invention, portions of the following carnallite product were leached with different amounts of water at 25° C.

The carnallite product, employed, showed by analysis to contain, as principal components, the following: 25.8% $MgCl_2$, 17.8% KCl, 8.78% $CaCl_2$, 4.20% $SrCl_2$, 2.24% NaCl, and 1.44% $NH_4Cl$.

As illustrative of the analysis of the resulting leachate, that which was produced when employing a weight ratio of water to total solids of 0.175 was: 16.9% $CaCl_2$, 9.67% $MgCl_2$, 6.48% $SrCl_2$, 1.17% NaCl, and 3.67% KCl.

The data showed the leachate or extraction to contain the following percents of $CaCl_2$ and $SrCl_2$ at the various water/total solids ratio:

| Carnallite in grams | 200 | 200 | 200 | 200 |
|---|---|---|---|---|
| Ratio of $H_2O$ to total solids | 0.125 | 0.150 | 0.175 | 0.20 |
| Percent of $CaCl_2$ present which was extracted | 66.0 | 72.0 | 80.8 | 99.4 |
| Percent of $SrCl_2$ present which was extracted | 37.0 | 46.8 | 64.3 | 90.8 |

The above values show that as the weight ratio of water to the total solids of the carnallite product is increased, the percent of both recovered $CaCl_2$ and $SrCl_2$ of that available definitely increases but that the percent of $SrCl_2$ recovered at a ratio of 0.125 of water to total solids is lower in $SrCl_2$ content than is desirable. As the ratio reaches 0.2, it shows that additional increase in the recovery of $SrCl_2$ by use of additional water is not great whereas the recovery of nearly all the $CaCl_2$ is effected. The employment of much more than .2 part of water per part of total solids is usually not considered to be warranted by sufficiently increased $SrCl_2$ recovery.

Example 5

A quantity of carnallite wash liquor obtained by leaching the carnallite product employed in Example 4 with water at a weight ratio of water to total solids of 0.19 was cooled in temperature steps from 40° down to 10° C.

Analysis of the carnallite wash liquor showed it to contain: 15.5% $CaCl_2$, 10.9% $MgCl_2$, 6.67% $SrCl_2$, 0.94% NaCl, and 3.37% KCl.

RESULTS OF ANALYSIS OF PRINCIPAL INGREDIENTS IN WEIGHT PERCENT REMAINING IN SUPERNATANT LIQUID AT VARYING TEMPERATURES

| Temperature in ° C | 40 | 30 | 25 | 20 | 10 |
|---|---|---|---|---|---|
| $CaCl_2$ | 15.48 | 15.67 | 16.39 | 17.00 | 18.04 |
| $MgCl_2$ | 10.94 | 10.73 | 10.97 | 10.76 | 10.67 |
| $SrCl_2$ | 6.67 | 6.66 | 5.11 | 4.12 | 2.42 |
| KCl | 3.37 | 3.30 | 3.10 | 2.93 | 2.53 |
| NaCl | 0.94 | 0.92 | 1.03 | 1.15 | 1.06 |
| $NH_4Cl$ | 0.29 | 0.29 | 0.28 | 0.25 | 0.20 |

A second quantity of carnallite leach liquor containing 4.27% $SrCl_2$ was cooled step-wise from 30° C. to 0° C.

RESULTS OF ANALYSIS IN WEIGHT PERCENT $SrCl_2$ IN SUPERNATANT LIQUID (FILTRATE) AND IN CRYSTALLINE SOLIDS

| Temperature in ° C | 30 | 20 | 10 | 5 | 0 |
|---|---|---|---|---|---|
| $SrCl_2$ in Filtrate | 4.27 | 3.31 | 2.44 | 1.61 | 1.36 |
| $SrCl_2$, percent recovered in solid phase | 0.0 | 24.8 | 47.5 | 66.0 | 71.9 |

The results of these data show that a greater percent of $SrCl_2$ is separated from the $CaCl_2$ in the wash or leach liquor at the lower temperatures.

Having described my invention, what I claim and desire to be protected by Letters Patent is:

1. The method of recovering strontium chloride from a brine containing water-soluble salts among which are strontium chloride, calcium chloride, magnesium chloride, and potassium chloride, and which may also contain sodium chloride and boron salts, wherein the weight ratio of calcium chloride to strontium chloride is at least 0.7 and not more than about 120 and the amount of calcium chloride concentration in the brine is not in excess of about 47.5 weight percent taken at 30° C., which comprises (1) evaporating said brine until substantially any sodium chloride present, and a substantial portion of the magnesium chloride and the potassium chloride have precipitated as carnallite but at least about 6 percent of magnesium chloride by weight of the thus concentrated brine and at least one mole of magnesium chloride per mole of potassium chloride remains in solution in the brine; (2) cooling the thus concentrated brine to a temperature of between about 50° C. and 24.8° C. to form, in a calcium chloride mother liquor, a solid phase product of the remaining potassium chloride and at least a substantial portion of the remaining magnesium chloride as crystalline carnallite together with crystalline strontium chloride, and some adhering calcium chloride mother liquor; (3) effecting physical separation of the solid phase having a minor proportion of mother liquor adhering thereto from a preponderant portion of the mother liquor; (4) admixing with the thus separated solid phase an amount of water sufficient to provide between about 0.1 and about 0.25 part by weight of water per part of total solids to leach and remove the strontium chloride and adhering calcium chloride mother liquor from the carnallite product and separating the leachate containing a preponderance of the calcium chloride, strontium chloride, and boron present from the solid phase containing the magnesium chloride and potassium chloride and any remaining sodium chloride; and (5) cooling the leachate so obtained sufficiently to crystallize out the strontium chloride present leaving the calcium chloride and boron compounds present in the liquor and thereafter effecting a physical separation of the strontium chloride crystals so formed from the liquor.

2. The method according to claim 1 wherein the leachate formed in step 4 thereof is recycled to recover additional magnesium chloride therefrom.

3. The method according to claim 1 wherein the brine employed has a weight ratio of $CaCl_2$ to $SrCl_2$ of between about 50 and about 100.

4. A process according to claim 1 wherein the concentrated solution is cooled to a temperature between about 28° and about 32° C. in step 2.

5. A process according to claim 1 wherein the carnallite is contacted in step 3 with an amount of water sufficient to provide between 0.14 and 0.2 part of water per part of total solids.

6. The method according to claim 1 wherein the strontium chloride is recovered by lowering the temperature of the leachate containing also calcium chloride and boron compounds to below 24.8° C.

7. The method according to claim 6 wherein said temperature is below 10° C.

References Cited by the Examiner
UNITED STATES PATENTS

| | | | |
|---|---|---|---|
| 1,305,566 | 6/1919 | Reeve | 23—38 |
| 1,594,707 | 8/1926 | Binder | 23—38 |
| 1,831,251 | 11/1931 | Jones | 23—298 |
| 2,980,502 | 4/1961 | Goodenough et al. | 23—89 XR |

NORMAN YUDKOFF, *Primary Examiner.*

GEORGE D. MITCHELL, *Examiner.*